April 4, 1972
J. J. COLLINS
3,654,144
PURIFICATION OF LIQUID HYDROCARBONS CONTAINING CARBONYL SULFIDE
Filed June 10, 1970
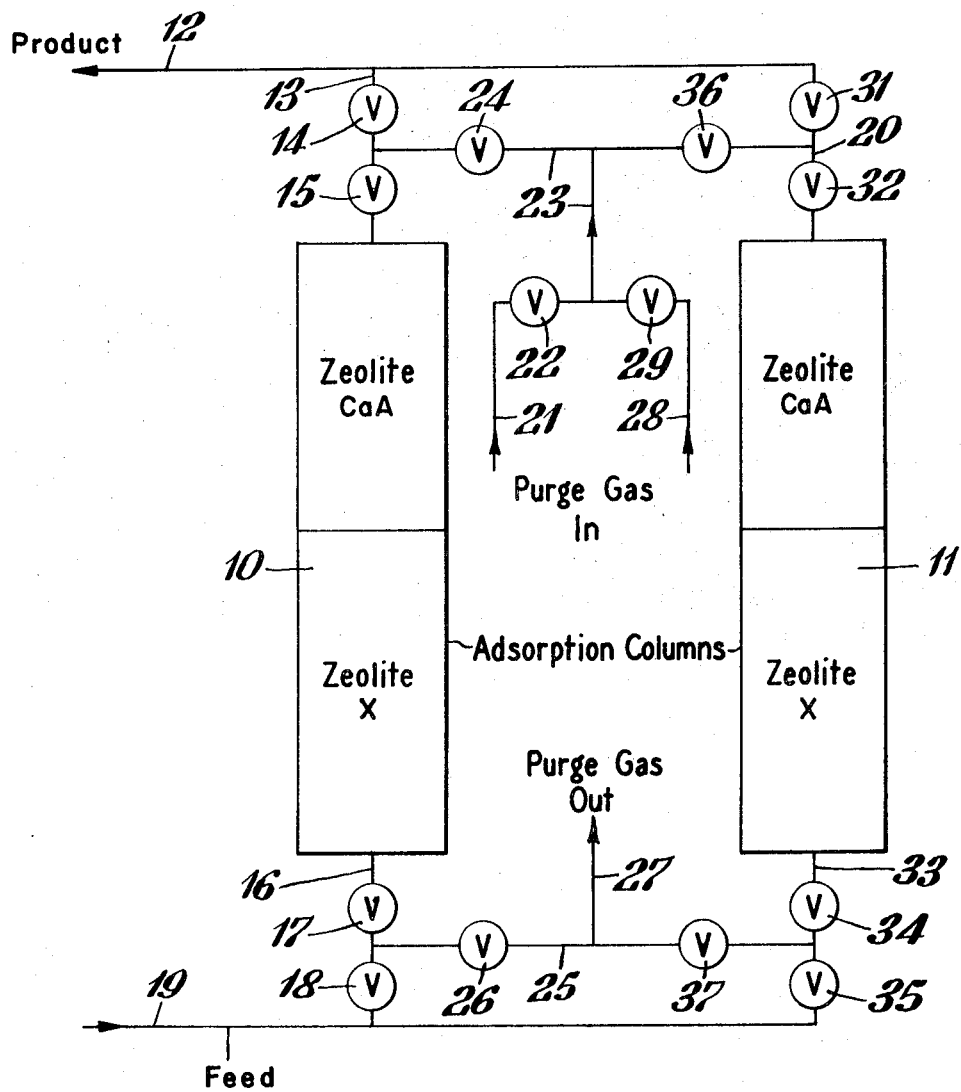
INVENTOR
JOHN J. COLLINS
BY *Richard H. Miller*
ATTORNEY United States Patent Office 3,654,144
Patented Apr. 4, 1972

3,654,144
PURIFICATION OF LIQUID HYDROCARBONS
CONTAINING CARBONYL SULFIDE
John Joseph Collins, Katonah, N.Y., assignor to Union
Carbide Corporation, New York, N.Y.
Filed June 10, 1970, Ser. No. 45,117
Int. Cl. C10g 29/22
U.S. Cl. 208—245     6 Claims

ABSTRACT OF THE DISCLOSURE

COS is removed as an impurity from hydrocarbon feedstocks by selective adsorption of the COS from the mixture thereof with the hydrocarbon in the liquid state using zeolite A which has been to some degree calcium cation exchanged. The liquid hydrocarbon stream containing sulfur compounds is passed through a bed of the modified zeolite A, and advantageously if other sulfur-containing impurities of larger molecular dimension are also present, the liquid hydrocarbon stream is also passed through a bed of molecular sieve having a pore size large enough to adsorb benzene.

The present invention relates in general to the desulfurization of hydrocarbons and more particularly to the removal of COS impurity from liquid hydrocarbon feedstocks using a particular modified zeolite A adsorbent. The invention also includes a process for the total desulfurization of liquid hydrocarbon streams such as natural gasoline.

The removal of carbonyl sulfide and other sulfur compounds such as mercaptans from hydrocarbon streams is desired for various reasons depending upon the final use of the hydrocarbon product. The lower boiling hydrocarbons such as propane and butane are utilized in large volumes as domestic fuel, and sulfur compounds are objectionable since they are corrosive and impart unpleasant odors. The higher boiling hydrocarbons, particularly in the range of $C_5$ to $C_{10}$, are used as gasoline blending stock and as feed to catalytic reformer and isomerization units wherein the sulfur compounds are deleterious to the expensive catalysts employed in such operations. In gasoline, sulfur compounds inhibit the activity of certain compounds customarily added to improve the octane rating. Since a large proportion of all petroleum produced is ultimately burned as fuel, sulfur compounds not previously removed are in some form released into the atmosphere and contribute to one of the most serious environmental pollution problems.

Carbonyl sulfide is relatively unique among the sulfur compound impurities of hydrocarbon stocks. Because of its low boiling point (—50° C.), it is not ordinarily encountered per se in liquid hydrocarbons which have been recently fractionated to remove propane and the lighter hydrocarbons. If, however, the sulfur compounds have not been thoroughly removed from such fractionated liquid hydrocarbon products, COS can readily reappear as a result of being formed by the reaction of carbon dioxide with hydrogen sulfide or other such precursor materials.

It has formerly been proposed to desulfurize hydrocarbons with either large or small pore zeolitic molecular sieves with the hydrocarbon being in either the vapor state or the liquid state. For example, in U.S. Pat. 3,211,644, issued Oct. 12, 1965, it is disclosed that sulfur compounds can be removed from hydrocarbon streams by passing them in the liquid state through a bed of molecular sieves having pore diameters of at least about 4.6 angstrom units. This pore size applies when the sulfur impurity is carbonyl sulfide or an alkyl mercaptan, but pore diameters of as low as about 3.8 are said to be satisfactory when the sulfur impurity is solely $H_2S$. Large pore zeolites have very little capacity, generally, for COS, with the result that COS appears in the effluent prematurely making it essential that the bed be regenerated before it even closely attains its capacity for the higher boiling sulfur compounds.

It is also known in the art that the sodium cation form of zeolite A having a pore size of about 4 angstrom units is capable of adsorbing COS and in fact is fairly effective in removing this sulfur compound from gaseous hydrocarbon streams. It is found, however, that sodium zeolite A has no practical capacity for COS under dynamic liquid contacting conditions. The economic advantage of treating normally liquid hydrocarbons in the liquid state as opposed to vaporizing and recondensing them is, on the other hand, compelling.

It is, therefore, the general object of the present invention to provide a process for removing COS as an impurity from liquid hydrocarbon streams.

Another object is to provide a process for the total desulfurization of hydrocarbon streams which contain COS and, in addition, sulfur compounds of substantially larger molecular dimensions than COS.

With regard to the embodiment of the invention when only COS removal is essential, the process for accomplishing this object comprises providing an adsorption zone containing sodium zeolite A which has been cation-exchanged with a bivalent metal cation to the extent of at least 20 to 100 equivalent percent and passing through said zone the COS-containing liquid hydrocarbon stream in intimate contact with said zeolite whereby the COS is selectively adsorbed and recovering the effluent purified hydrocarbon stream.

The COS-containing liquid hydrocarbon feedstocks which are suitably treated in accordance with this invention are not narrowly critical with respect to the hydrocarbon components thereof. Feedstocks consisting of a single hydrocarbon component wherein the hydrocarbon contains from $C_2$ to $C_4$ carbon atoms are suitably treated. However, the COS-containing hydrocarbon feedstock may also be a full range hydrocarbon condensate having a composition range of $C_2$–$C_{12}$ hydrocarbon compounds.

The modified zeolite A molecular sieve adsorbent which is essential to the practice of all embodiments of this invention is the alkali metal cation form of zeolite A which has been ion-exchanged with alkaline earth metal cations, preferably calcium cations, to the extent of from about 20 to about 100 equivalent percent, i.e., the crystalline zeolitic molecular sieve, having the chemical composition expressed in terms of mole ratios of oxides:

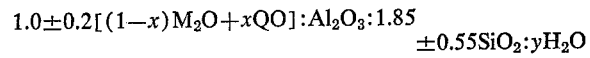

$$1.0 \pm 0.2[(1-x)M_2O + xQO]:Al_2O_3:1.85 \pm 0.55 SiO_2 : yH_2O$$

wherein y ranges from essentially zero to about 6 depending, for instance, on the degree of thermal activation to which the zeolite has been subjected, x is a value ranging from about 0.20 to about 1.0, M represents alkali metal having atomic numbers less than 87, at least 75 atoms percent of those alkali metal cations present having atomic numbers less than 19, and Q represents alkaline earth metal. It is preferred that Q represent the calcium cation. It will be understood by those skilled in the art that the adsorption capacity of the zeolite for COS is greatest when the value of y is substantially zero, and, accordingly, that the zeolite will be utilized advantageously in its substantially dehydrated state. The lines of the X-ray powder diffraction pattern of zeolite A which, taken in conjunction with the above-defined composition, identify the particular zeolite of the present invention as follows. In obtaining the X-ray pattern, standard techniques are employed. The radiation is the K-alpha doublet of copper,

TABLE A

Of value of reflection in A

| | |
|---|---|
| 12.2±0.2 | 3.38±0.06 |
| 8.6±0.2 | 3.26±0.05 |
| 7.05±0.15 | 2.96±0.05 |
| 4.07±0.08 | 2.73±0.05 |
| 3.68±0.07 | 2.60±0.05 |

The method of preparation of the cation-exchanged form of zeolite A molecular sieve used herein is described in detail in U.S. Pat. No. 2,882,243, issued Apr. 14, 1959.

In the embodiment of the invention wherein the hydrocarbon stream contains, in addition to COS, a sulfur compound impurity having a critical molecular dimension larger than COS, a novel dual adsorbent bed system is employed. In addition to a bed of the particular bivalent metal cation-exchanged zeolite A defined hereinbefore, an additional bed of a molecular sieve zeolite, having a pore size large enough to adsorb benzene, is employed. Such large pore zeolites include zeolite X, described in detail in U.S. Pat. No. 2,882,244; zeolite Y, described in detail in U.S. Pat. No. 3,130,007; zeolite L, described in detail in U.S. Pat. No. 3,216,789; zeolite described in detail in pending U.S. application Ser. No. 655,318, filed July 24, 1967; and large pore synthetic mordenite as described in U.S. Pat. No. 3,436,174, issued April 1, 1969. The natural mineral faujasite and strongly acid-extracted natural and small pore synthetic mordenite which have apparently expanded pores, are also suitable. The cation form of these pore zeolites is not a critical factor and, in fact, the stable forms of decationized for cation deficient forms of these zeolites can be used. The beds of the two different zeolite adsorbents can be separate or can be contained in a single bed in separate zones thereof. The order in which the sour liquid hydrocarbon stream contacts the two zeolite masses is not critical, but it is preferred that the first to be contacted by the hydrocarbon is the large pore, i.e., benzene adsorbing, species. The same hydrocarbon compositions are suitable for both process embodiments.

The sulfur-compound impurities other than COS which can be present in the hydrocarbon feedstocks comprises at least one but ordinarily a mixture of two or more of hydrogen sulfide, the alkyl mercaptans such as ethyl mercaptan, n-propyl mercaptan, isopropyl mercaptan, n-butyl mercaptan, isobutyl mercaptan, t-butyl mercaptan, and the isomeric forms of amyl and hexyl mercaptan, and higher alkyl mercaptans having up to about 10 carbon atoms, the heterocyclic sulfur compounds such as thiophene and 1,2-dithiol, the aromatic mercaptans exemplified by phenyl mercaptan, organic sulfides and disulfides generally.

The process will efficiently handle feed streams containing minute traces of sulfur on the order of $0.5 \times 10^{-4}$ wt. percent up to those containing 2 wt. percent up to those containing 2 wt. percent sulfur compounds.

The processes of this invention are illustrated by the following description in conjunction with the drawing. Although the description contemplates the presence of COS and at least one large mercaptan such as isobutyl mercaptan, it will be understood that when COS is present or is the sole sulfur impurity to be removed, the adsorbent beds need only contain the alkaline earth exchanged zeolite A. Referring now more specifically to the flow diagram in the drawing, two beds, 10 and 11 are provided, each containing in the upper section thereof zeolite X and in the lower section thereof sodium zeolite A containing 25 equivalent percent calcium cations. The beds are piped in parallel flow relation so that when one bed is on the adsorption stroke, the other bed is being regenerated by purging and cooldown. In this manner, a continuous supply of sulfur compound-depleted hydrocarbon liquid is available for consumption.

The sulfur compound-containing liquid hydrocarbon feed stream is introduced through conduit 19, preferably at ambient temperature although there is no sharply defined critical region in this respect. Choice of optimum temperature depends on an economic balance between savings in zeolitic molecular sieve material by virtue of higher adsorptive capacities at lower temperatures, and the cost of heat exchangers to obtain the lower temperature. With regard to feed pressure, the only limitation in this respect is that the pressure be sufficiently high to keep the feed in the liquid phase throughout the adsorber bed to avoid internal flashing with consequent poor contact with the molecular sieve and attrition of particles. It has been found that the adsorption step is efficiently performed with feed liquid superficial linear velocities of 0.1 to 20 feet per minute, and preferably between 0.5 and 10 feet per minute. The sulfur compound-containing hydrocarbon feed stream, namely a full range natural gas condensate containing 0.01 weight percent COS and 0.05 weight percent alkyl mercaptans, is directed from conduit 19 to communicating conduit 16 joining at its opposite end with the inlet and lower end of first adsorbent bed 10 wherein the feed stream initially contacts the large pore zeolite X mass and thereafter the small port alkaline earth modified zeolite A. It is to be understood that the optimum relative quantities of zeolite X and alkaline earth modified zeolite A are selected in view of the relative proportions of COS and the other sulfur compounds in the hydrocarbon mixture. Advantageously, sulfur-compound breakthrough of both COS and any other sulfur compound occurs simultaneously. Although two discrete adsorption zones are illustrated in the drawing, the two types of zeolites can be admixed to form one zone if desired. Conduit 16 also contains control valves 17 and 18 arranged in a series relationship. For purposes of the illustration, the adsorption stroke is upward through bed 10. When the zeolitic molecular sieve bed 10 is filled with liquid, the withdrawal of purified liquid hydrocarbon product from the upper end of the bed is begun through conduit 13 and control valves 15 and 14 therein. The desulfurized liquid hydrocarbon product stream is discharged from the system through communicating conduit 12. As the adsorption step or stroke is continued, the sulfur compounds are selectively adsorbed by the molecular sieve in upwardly advancing zones.

The adsorption step may be continued until the appearance of sulfur compounds in the product indicates that the capacity of the molecular sieve has been attained. At this point, however, the free spaces in the bed not occupied by molecular sieve material are filled with sour liquid hydrocarbon which must either be sent to a fresh molecular sieve bed or discarded.

At this point, valves 14, 17 and 18 are closed and the sour liquid hydrocarbon fed stream is diverted from conduit 19 through communicating conduit 33 to second zeolitic molecular sieve bed 11 which has previously been desorbed and recooled. The depressurization or blowdown draining of first bed 10 should be carried on gradually to prevent excessive flashing, movement of the pellets and attrition.

A purge gas is introduced through conduit 28 and control valve 29 therein to branch conduit 23. The cold nonadsorbable gas should be nonreactive with respect to the adsorbed sulfur compound, and may for example be methane, hydrogen or nitrogen. It may thus be seen that the cold displacement gas may be supplied from the same source as the hot nonadsorbable purge gas. The cold displacement gas is introduced through conduit 23 and communicating conduit 13 with control valve 15 therein to the upper end of first bed 10 for displacement of the interstitial liquid from the bed.

As an alternate method for displacing the interstitial liquid from the sulfur compound-loaded bed 10, conduit 28 may be eliminated and a small amount of heated nonadsorbable purge gas may be introduced through conduit 21 for displacement purposes.

In the desorption step, a hot substantially nonadsorbable purge gas is supplied to conduit 21 at a temperature preferably between 450° F. and 750° F., the purge gas being nonreactive with respect to sulfur. Suitable purge gases include methane, hydrogen and nitrogen. These gases have molecular dimensions sufficiently small to pass through the pores of the present crystalline zeolitic molecular sieves and thus be adsorbed therein, but their respective boiling points are sufficiently low so that the attractive forces between the pore walls and the molecules are so small as to prevent substantial adsorption.

The nonadsorbable purge gas is directed through conduit 21 and control valve 22 therein to branch conduit 23 containing valve 24. Conduit 23 joins inlet conduit 13 between valves 14 and 15, and the hot purge gas is introduced therethrough to the upper end of first zeolitic molecular sieve bed 10 for downward flow and removal of adsorbed sulfur compound. The sulfur compound laden purge gas is discharged from the lower end of first bed 10 through conduit 16 containing valve 17, and directed through branch conduit 25 containing valve 26 therein to discharge conduit 27 for use as desired. The purge gas flow is continued in this manner until the first bed 10 is fully activated, for example at the bed temperature usually at least 500° F.

At the end of the previously described desorption step, the regenerated first bed 10 is cooled and refilled with liquid. A satisfactory method for cooling is by controlltd introduction of purified product through conduit 13 into the upper end of bed 10. To achieve this flow, valves 14, 15, 17 and 26 are opened and valve 24 is closed. The appearance of liquid at the lower end of bed 10 is indicative that the temperature of the bed has been lowered sufficiently so that feed liquid may be fed into the lower end of bed 10 to refill the bed and institute an adsorption purification stroke. It has been found that about 20 to 35 gallons of coolant are desirable per 100 pounds of molecular sieve to be cooled. The coolant is preferably fed at a rate of 1 to 4 gallons per minute per square foot of bed cross section, the maximum rate being 8 gallons per square foot per minute. Valve 26 is then closed and valve 18 opened, and the first bed 10 is placed back on the adsorption stroke.

It should be noted that the second bed 11 of zeolitic molecular sieve material is operated in a manner analogous to that of first bed 10 so that during the adsorption step, sour feed is introduced through conduit 19 to communicating conduit 33 having flow control valves 35 and 34 arranged in a series relationship at the lower end of bed 11. The desulfurized hydrocarbon liquid is withdrawn from the upper end of second bed 11 through conduit 20 having flow control valves 32 and 31 therein arranged in series. During the desorption stroke, the hot purge gas is introduced through valve 36 in branch conduit 23 communicating with conduit 20, the sulfur compound-laden purge gas discharged from the lower end of second bed 11 is removed from the system through valve 37 in conduit 25.

To illustrate the apparently unique relationship between COS as an adsorbate and zeolite NaA which has been cation-exchanged with an alkaline earth cation to the extent of at least 20 equivalent percent, the following experiments were carried out:

To test the ability of sodium zeolite A to adsorb carbonyl sulfide purely from considerations of pore size and the molecular dimensions of the adsorbate COS, vapors of carbonyl sulfide were admitted to a chamber containing a sodium zeolite A mass having imbedded therein a thermocouple. A sharp rapid temperature rise of 38° F. was observed in the case of carbonyl sulfide. Similarly tested, propyl mercaptan and thiophene produced only a 3° F. and an 8° F. rise respectively. This demonstrated that in the gaseous state COS is strongly adsorbed by a zeolitic molecular sieve having a pore size of only about 4 angstroms.

Under dynamic liquid contacting conditions, however, the results were quite different. For these experiments, a series of cylindrical adsorbent beds 0.62 inch in diameter were prepared and filled with various zeolite types. Some beds were 10 feet in length and others were 5 feet in length. The zeolites were utilized in the form of clay bonded particles. Conditions common to all experiments were:

Molecular sieve particle size—14 x 30 mesh
Molecular sieve binder content—~20%
Operating pressure, p.s.i.g.—75
Operating temperature, ° F.—72–80
Flow rate, pounds/hour—2.4–2.8
Superficial linear flow velocity, feet/minute—0.5

In Table B, 13X indicates the sodium cation form of zeolite X as described in U.S. Pat. No. 2,882,244; 4A indicates the sodium cation form of zeolite A as described in U.S. Pat. No. 2,882,243; 25% $Ca^{++}$ 4A, 40° $Ca^{++}$ 4A and 65–70% $Ca^{++}$ 4A indicates a 4A (supra) zeolite which has been calcium cation exchanged to the extent of 25, 40 and 65 to 70 equivalent percent.

TABLE B

| Experiment Number | Sulfur compounds in feed,[1] p.p.m.(wt.) | | | Description of absorber | | | Pounds of product processed prior to breakthrough of 20 p.p.m. (wt.) level of each of the components below | | |
|---|---|---|---|---|---|---|---|---|---|
| | $COS^{[2]}$ | $n$-$C_3H_7SH$ | iso-$C_3H_7SH$ | Bed length (feet) | Type zeolite | Weight (grams) | $COS^{[2]}$ | $n$-$C_3H_7SH$ | iso-$C_3H_7SH$ |
| 1 | 210 | | | 10 | 13X | 340 | 4.8 | | |
| 2 | 200 | 490 | | 10 | 4A | 391 | <2.0 | <1.5 | |
| 3 | 150 | 500 | | 5 | 25% $Ca^{++}$ 4A | 176 | 8.8 | 5.8 | |
| 4 | 225 | 480 | | 5 | 40% $Ca^{++}$ 4A | 172 | 12.2 | >27 | |
| 5 | 225 | 480 | | 10 | 40% $Ca^{++}$ 4A | 345 | 28 | | |
| 6 | 280 | 385 | | 5 | 65–70% $Ca^{++}$ 4A | 172 | 12.4 | >34 | |
| 7 | 280 | 385 | | 10 | 65–70% $Ca^{++}$ 4A | 347 | 29.0 | | |
| 8 | 230 | | 450 | 5 | 25% $Ca^{++}$ 4A | 179 | 11.0 | | |
| 9 | 230 | | | 10 | 25% $Ca^{++}$ 4A | 357 | | | <1.0 |
| 10 | 225 | | 380 | 10 | Compound bed [3] | 360 | 24.0 | | 13.0 |

[1] A 12# RVP (stabilized) natural gasoline.
[2] Not normally present. Added for purposes of these experiments.
[3] 2 feet of 13X (65 grams) followed by 8 feet of 25% $Ca^{++}$ 4A (295 grams).

What is claimed is:

1. Process for removing carbonyl sulfide as an impurity from a liquid hydrocarbon stream which comprises passing said COS-containing hydrocarbon stream through an adsorbent bed containing dehydrated zeolite A having the chemical composition expressed in terms of mole ratios of oxides:

$$1.0 \pm 0.2[(1-x)M_2O + xQO]:$$
$$Al_2O_3 : 1.85 \pm 0.55 SiO_2 : yH_2O$$

wherein $y$ ranges from zero to about 6, $x$ has a value of from about 0.20 to about 1.0, M represents an alkali metal cation having an atomic number less than 87, with the proviso that at least 75 atom percent of the cations designated by M have atomic numbers less than 19, and Q represents an alkaline earth metal cation, whereby COS is adsorbed and the effluent hydrocarbon stream is substantially devoid of COS.

2. Process according to claim 1 wherein Q represents the $Ca^{++}$ cation.

3. Process according to claim 2 wherein Q has a value of about 0.40.

4. Process for the total desulfurization of a sour hydrocarbon feedstock which comprises passing said hydrocarbon feedstock containing COS and at least one sulfur compound having a critical dimension of greater than 5 angstroms in the liquid state through an adsorption bed containing at least two different adsorbent materials, one being an activated zeolitic molecular sieve having a pore diameter large enough to adsorb benzene and the other being activated zeolite A having a composition expressed in terms of mole ratios of oxides:

$1.0\pm0.2[(1-x)M_2O+xQO]$:
$Al_2O_3:1.85\pm0.55SiO_2:yH_2O$ wherein $y$ ranges from zero to about 6, $x$ has a value of from about 0.20 to about 1.0, M represents an alkali metal cation having an atomic number less than 87, with the proviso that at least 75 atom percent of the cations designated by M have atomic numbers less than 19, and Q represents an alkaline earth metal cation, and recovering the hydrocarbon effluent from said adsorbent bed.

5. Process according to claim 4 wherein Q represents the $Ca^{++}$ cation.

6. Process according to claim 5 wherein Q has a value of about 0.40, and the zeolite having the pore size large enough to adsorb benzene is zeolite X.

References Cited
UNITED STATES PATENTS

| | | | |
|---|---|---|---|
| 2,882,243 | 4/1959 | Milton | 252—455 |
| 2,882,244 | 4/1959 | Milton | 252—455 |
| 3,098,814 | 7/1963 | Epperly | 208—91 |
| 3,211,644 | 10/1965 | Clark | 208—245 |
| 3,490,865 | 1/1970 | Huxley | 23—3 |
| 1,836,577 | 12/1931 | Cross | 208—307 |
| 3,098,705 | 7/1963 | Baily | 23—3 |
| 3,051,646 | 8/1962 | Brooke | 208—250 |

DELBERT E. GANTZ, Primary Examiner

J. M. NELSON, Assistant Examiner

U.S. Cl. X.R.

23—3; 208—307